Patented May 9, 1950

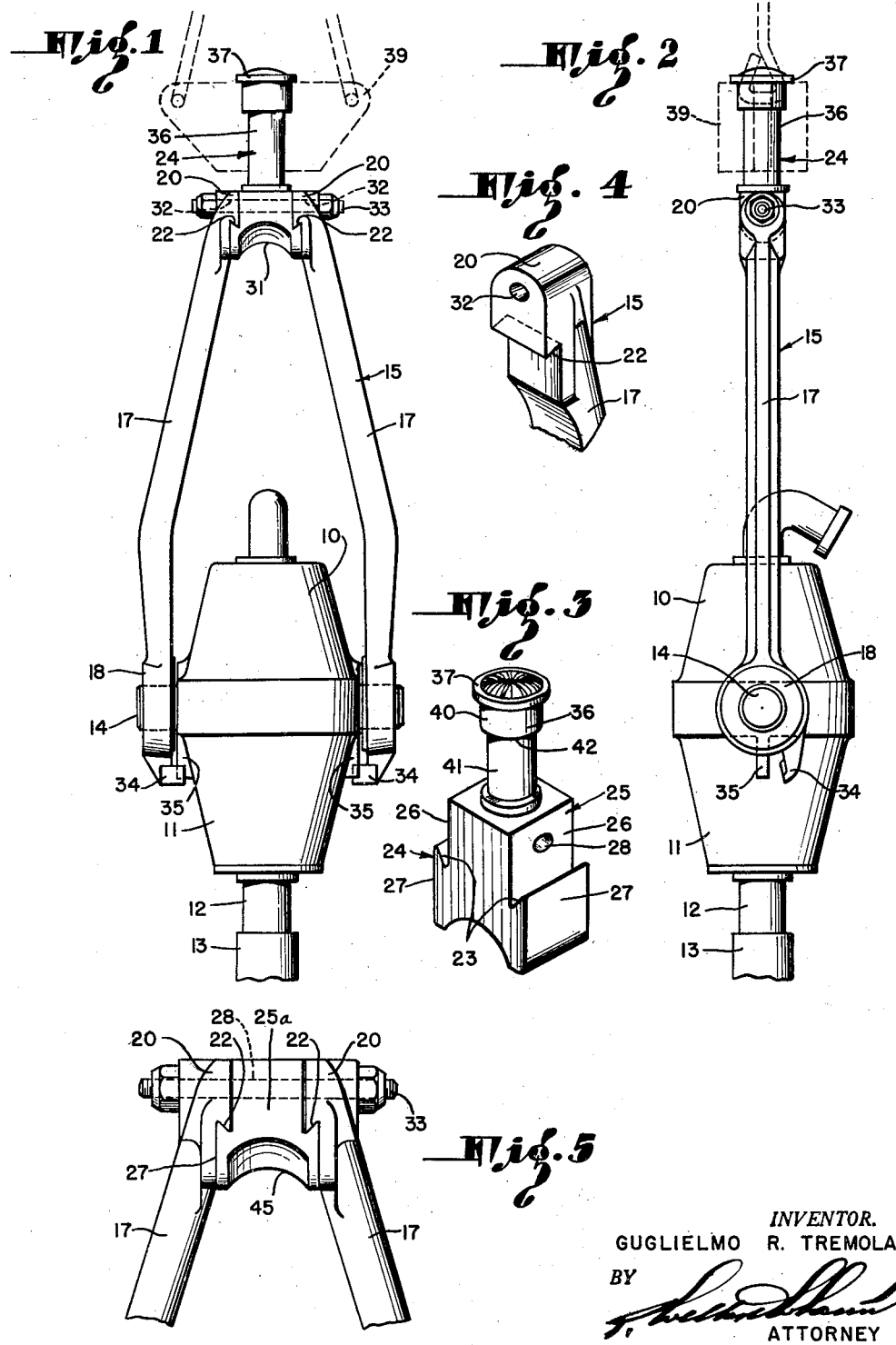

2,506,655

UNITED STATES PATENT OFFICE 2,506,655

SWIVEL SUSPENSION MEANS

Guglielmo R. Tremolada, Los Angeles, Calif., assignor to Emsco Derrick & Equipment Company, Los Angeles, Calif., a corporation of California Application May 9, 1945, Serial No. 592,835

4 Claims. (Cl. 294—82)

This invention relates to a simple and dependable means for suspending swivels employed in oil well drilling operations. This application is a continuation-in-part of my co-pending application, Serial No. 546,038, filed July 21, 1944, for Swivel suspension means, now abandoned.

It has been accepted practice in the oil well drilling art to support the rotary swivel by means of a forged steel bail consisting of a U-shaped forging having enlargements at the ends with openings to receive the trunnions which project from the swivel body. In order to connect such a bail to a swivel, it is necessary to bend the bar portion of the bail to bring the enlargements at the ends of the bail into co-operative relation to the trunnions of the swivel body. General practice involves the heating of the bar portion of the bail so as to render the same sufficiently plastic to permit the bringing of the bail ends into positions around the trunnions. These operations of course involve material, labor and expense and care must be taken to avoid injury to the molecular structure of the steel as the result of application of heat; otherwise, the bail may develop one or more points of weakness, rendering it unsafe when used for its intended purpose of supporting great loads.

It is an object of the invention to provide a suspension means for a swivel composed of several cooperating parts which may be formed and heat treated and inspected prior to assembly, which parts when assembled will constitute a rigid and durable means for supporting a swivel.

The standard hairpin type of bail is exposed to relatively rapid wear where it is engaged by the hook, resulting in failure of the bail. It is an object of the invention to provide a bail wherein the part which is engaged by the hook comprises a separate piece relatively massive and capable of being heat treated so as to minimize the wear thereon by the hook, thereby avoiding failure of the bail as a result of hook wear.

A further object of the invention is to provide a bail which may be readily converted from elevator type to hook type, to obtain advantages which will be set forth in detail in the following part of the specification.

In applying the ordinary type of hairpin type bail to a rotary swivel great care must be exercised to avoid injury to the swivel structure. A number of instances are of record wherein the swivel has been deformed by inadvertent application of heavy pressure on opposite sides thereof in squeezing the ends of the bail together around the trunnion in a powerful press such as used for this purpose. My present invention avoids all danger of injury to the swivel from this source, for the reason that the bail is assembled in operative relation to the swivel from separate parts.

Many types of repair or reworking of the swivel structure require removal of the bail so as to get it out of the way during machine operation. Where my present invention is used, the bail may be readily disconnected from the swivel body by removal of a single bolt, and then after the repair work is completed, the bail may be reassembled upon the swivel body; whereas, where the hairpin type of bail is employed with a swivel body and having projecting trunnions, it is necessary to spread the legs of the bail in order to remove the same from the swivel body, and then after completion of the repair or machine work upon the swivel, considerable labor and expense is involved in reapplying the bail to the swivel body.

My invention provides many advantages as set forth herein, and also provides a bail which may be manufactured at less cost than the standard type of bail which must be forged in a drop hammer. The parts of the present invention may be machined with desired accuracy prior to the assembly of the parts; whereas, in the old type of forged bail, accuracy and uniformity are difficult to obtain. For example, in the old hairpin type of bail it is necessary to drill the trunnion openings about one-eighth of an inch oversize, resulting in a sloppy fit with the trunnions, but in the present invention close tolerances may be preserved.

When the swivel is not in use, it is placed at one side of the derrick. My present invention provides means cooperating between the bail and the swivel body for maintaining the bail in a position wherein the hoisting means—either hook or elevator—may be readily connected to the bail. It is an object of the invention to provide a bail having a pair of legs, the lower ends of which are connected to the swivel and the upper ends of which are clamped against opposite faces of a central body or lifting member by means of a single bolt, it being an object of the invention to provide sloping shoulders cooperating between the upper ends of the legs and the sides of the lifting member or central body, so that the application of a load through the lifting member to the legs will not increase the strain upon the bolt, but such load will be transmitted directly from the lifting member to the upper ends of the legs.

Further objects and advantages of the invention will be brought out in the following part of the specification.

Referring to the drawing which is for illustrative purposes only,

Fig. 1 is a face view of a preferred form of my invention.

Fig. 2 is a side view of the suspension means shown in Fig. 1.

Fig. 3 is a perspective side view of the lifting member of the suspension means.

Fig. 4 is an enlarged perspective view of the upper end of one of the legs of the suspension means.

Fig. 5 is a fragmentary view showing the upper portions of the legs of the bail with a hook-type lifting member clamped therebetween.

Fig. 1 shows a rotary swivel 10 of the general type employed in the drilling of wells, this rotary swivel 10 having a casing 11 containing the customary thrust and radial bearings, not shown, for supporting the hollow spindle 12 which is connected to the upper end of a string of drill pipe 13. The casing 11 has oppositely extending trunnions 14 for engagement by a bail. In Figs. 1 and 2 I show a suspension means 15 of my present invention engaging the trunnions 14 and extending upwardly from the swivel 10 so as to be engaged by the hoisting apparatus of a derrick.

The suspension means 15 comprises three main parts consisting of a pair of side links or legs 17 and a lifting member 24. The legs 17 have at their lower ends enlargements 18 which are bored so as to provide aligned openings 19 to receive the trunnions 14 when the parts are assembled as shown. The upper ends of the legs 17 are provided with head 20 which lie on opposite sides of the lower portion of the lifting member 24 and have inwardly and downwardly sloping, downwardly faced shoulders 22, these shoulders 22 being in lateral relation to the axis of the lifting member 24. The head 20, as shown also in Fig. 4, of each leg 17 has a transverse opening 32 of working fit with a bolt or screw member 33 adapted to clamp the heads 20 tightly against the sides of the lower portion of the lifting member 24.

As shown in Figs. 1, 2, and 3, the lifting member 24 has an upper cylindric portion 36 with a collar or shoulder 37 at its upper end to provide a downwardly disposed face for engagement by an elevator device 39 of the known type employed for lifting pipe in a derrick, when such elevator device 39 is closed around the cylindric portion 36 of the member 24. The lower part of the lifting member 24 consists of a body 25 having oppositely disposed faces 26 and 27 for engagement by the heads 20 of the legs 17. These faces 26 and 27 are in offset relation and are joined by shoulders 23 disposed in lateral relation to the axis of the lifting member 24, these faces 23 being faced upwardly and sloping upwardly and outwardly for matching engagement with the shoulders 22 of the heads 20, when the heads 20 are bolted against the faces 26 and 27 by the bolt 33 which passes through the openings 32 of the heads 20 and through an opening 28 in the body 25 aligned with the openings 32, for the reason that the spaces and shoulders of co-engagement between the heads 20 and the body 25 lie in crossing planes and thereby prevent movement of the legs from the positions in which they are clamped by the bolt 33. When an upward pull is exerted on the lifting member 24, the sloping faces 22 and 23 act to move the heads 20 toward the side faces of the body 25, and at the same time the load is transmitted through the shoulders 23 of the body 25 to the shoulders 22 of the heads 20 without applying any material additional strain to the bolt 33.

The enlargements 18 at the lower ends of the legs 17 are provided with integrally cast downwardly projecting lugs 34 positioned so that when the suspension means 15 is swung a described distance, preferably 30°, to either side of the centralized relation to the swivel 10, one of the lugs 34 will engage a stop 35 of which two are provided on the shell 11 of the swivel 10 in positions for engagement by the lugs 34. The bail 15 is by this arrangement prevented from swinging down along either side of the swivel body, and when the swivel is not in use, the bail is maintained in an upwardly projecting position so that it may be readily engaged by the hoisting apparatus.

In the drilling of oil wells, it is often necessary to change the size of drill pipe employed. For example, the drilling of a well may be started with drill pipe of one size and then after a period of operation, it becomes necessary to change to a drill pipe of another diameter. A change in drill pipe size requires a corresponding change in the size of the elevator employed. It is now an extensive practice to employ the pipe elevator for the support of the rotary swivel, the elevator being under such circumstances, closed around a cylindric projection which extends upwardly from the bail of the swivel. Of course, when the size of the elevator is changed, it is necessary to change the size of this projection on the bail to correspond. This has constituted a problem which is solved in a simple manner by my invention. The cylindric extension 36 is of stepped form so as to provide a plurality of cylindric portions 40 and 41 corresponding to several pipe sizes and therefore corresponding to several different elevator sizes. At the upper end of the cylindric portion 40 there is the collar or shoulder 37 for engagement by the upper end of the elevator which is closed around the cylindric portion 40, and at the upper end of the cylindric portion 41 there is a shoulder 42 for engagement with the upper end of the elevator which is closed around the cylindric portion 41. Accordingly, the lifting member 44 may be employed with several elevator sizes.

When, during the course of the drilling operation, it becomes necessary to change the size of elevator 39 beyond the range accommodated by the lifting member 24, the lifting member 24 may be removed and replaced by another of a size to accommodate the new elevator—that is to say, having a shank with a cylindric portion corresponding to the pipe opening of the new elevator. If a lifting member 24 is not available to accommodate the size of elevator which must be employed, the lifting member 25a shown in Fig. 5 may be substituted for the lifting member 24, and the hoisting hook of the derrick may then be used instead of the elevator, as a hook is always a part of the drilling equipment in a derrick.

The lifting member 25a is substantially the body 25 shown in Fig. 3, with the shank or stem 36 eliminated. The lifting member 25a has side faces 26 and 27 and the sloping shoulders 23 of the same size and disposition as those of the body 25, and the lifting member 25a may be readily substituted for the body 25 between the heads 20 at the upper ends of the legs 17 of the bail. The lifting member 25a has a downwardly faced curved seat for engagement by the hook, and this lifting member 25a is massive as compared to the physical dimensions of the curved portion at the upper end of the standard hairpin type bail so that it may be used almost indefinitely without failure as the result of wear. Furthermore, since the lifting member 25a is made as a separate part, it may be heat treated so that at least the lower portion thereof will be so hard to effectively resist the wear which would ordinarily result from the engagement of the hook with its concave face 45. The suspension means shown in Fig. 5 has all of the advantages described with relation to the suspension means shown in Fig. 1 with the exception, of course, that it cannot be lifted by a pipe elevator. It can be readily assembled upon the swivel, with the required alignment of parts preserved, and may be removed and replaced with facility when desired. For example, when it becomes necessary to send the swivel back to the factory for replacement of bearings or other repair, it is not necessary to ship the suspension means therewith, and removal and replacement of the suspension means can be accomplished without danger to the swivel.

I claim as my invention:

1. In a suspension means for a rotary swivel having trunnion elements extending therefrom, the combination of: a pair of legs having openings at the lower ends thereof to receive said trunnion elements and having at the upper ends thereof downwardly and inwardly sloping downwardly faced shoulders; a lifting member disposed between the upper ends of said legs and having upwardly and outwardly sloping upwardly faced shoulders engaging said downwardly faced shoulders of said legs, said lifting member having a downwardly presented portion of such size as to be engageable by a lifting hook, whereby the lifting force applied to said hook will be received by said lifting member and transmitted through the shoulders thereof to said shoulders of said heads; and means for clamping the upper ends of said legs against the sides of said lifting member.

2. In a suspension means for a rotary swivel having trunnion elements extending therefrom, the combination of: a pair of legs having at the lower ends thereof enlargements provided with openings to receive said trunnion elements and having at the upper ends thereof heads having inwardly offset portions with downwardly faced shoulders in crossing relation to vertical, there being aligned bolt openings through said heads above said shoulders; a lifting member disposed between said heads, said lifting member having a filler portion with side faces to be engaged by said heads and having an enlargement forming upwardly faced shoulders engaging said downwardly faced shoulders of said heads, said lifting member having a bolt opening therethrough in alignment with said bolt openings of said heads and said enlargement of said lifting member having at its lower end a downwardly faced concave and curved face to be engaged by a lifting hook, whereby the lifting force applied by said hook will be received by said enlargement and transmitted through the shoulders thereof to said shoulders of said heads; and bolt means extending through said bolt openings to clamp said heads against said lifting member.

3. In a suspension means for a rotary swivel having trunnion elements extending therefrom, the combination of: a pair of legs having openings at the lower ends thereof to receive said trunnion elements and having at the upper ends thereof heads having on the inner faces thereof downwardly faced shoulders, there being aligned bolt openings through said heads; a lifting member disposed between said heads, said lifting member having upwardly faced shoulders engaging said downwardly faced shoulders of said heads, said lifting member having a bolt opening therethrough in alignment with said bolt openings of said heads and said lifting member having a downwardly faced concave and curved face to be engaged by a lifting hook, whereby the lifting force applied by said hook will be received by said enlargement and transmitted through the shoulders thereof to said shoulders of said heads; and bolt means extending through said bolt openings to clamp said heads against said lifting member.

4. In a suspension means for a rotary swivel having trunnion elements extending therefrom, the combination of: a pair of legs having at the lower ends thereof openings to receive said trunnion elements and having at the upper ends thereof inwardly offset portions with downwardly faced shoulders in crossing relation to vertical, there being aligned bolt openings through the upper ends of said legs above said shoulders; a lifting member disposed between the upper ends of said legs, said lifting member having a filler portion with side faces to be engaged by said legs and having an enlargement forming upwardly faced shoulders engaging said downwardly faced shoulders of said legs, said lifting member having a bolt opening therethrough in alignment with said bolt openings of said legs and said enlargement of said lifting member having at its lower end a downwardly faced concave and curved face to be engaged by a lifting hook, whereby the lifting force applied by said hook will be received by said enlargement and transmitted through the shoulders thereof to said shoulders of said legs; and bolt means extending through said bolt openings to clamp said legs against said lifting member.

GUGLIELMO R. TREMOLADA.

REFERENCES CITED

The following references are of record in the file of this patent:

UNITED STATES PATENTS

| Number | Name | Date |
| --- | --- | --- |
| 502,974 | Knox | Aug. 8, 1893 |
| 681,937 | Spink | Sept. 3, 1901 |
| 1,219,268 | Dodge | Mar. 13, 1917 |
| 1,285,102 | Foster | Nov. 19, 1918 |
| 1,610,441 | Gibson | Dec. 14, 1926 |
| 1,649,208 | Barry | Nov. 15, 1927 |
| 1,766,562 | Swain | June 24, 1930 |
| 1,767,325 | Taylor | June 24, 1930 |
| 1,825,018 | Smith | Sept. 29, 1931 |
| 1,975,940 | Harding | Oct. 9, 1934 |
| 2,043,460 | Young | June 9, 1936 |